United States Patent [19]

Putnam et al.

[11] Patent Number: 4,582,423

[45] Date of Patent: Apr. 15, 1986

[54] DEVICE FOR DEGASSING DIAZOTYPE MATERIALS BY CONVECTION HEATING

[75] Inventors: Robert Putnam; Robert Harris, both of Chester; George Norton, Ivoryton, all of Conn.

[73] Assignee: Blu-Ray Incorporated, Essex, Conn.

[21] Appl. No.: 651,269

[22] Filed: Sep. 17, 1984

[51] Int. Cl.⁴ .............................................. G03B 27/30

[52] U.S. Cl. ...................................... 355/106; 354/300

[58] Field of Search ............................ 355/106, 27, 28; 354/300

[56] References Cited

U.S. PATENT DOCUMENTS

| | | | |
|---|---|---|---|
| 3,720,150 | 3/1973 | Hurtig et al. | 354/300 X |
| 4,358,193 | 11/1982 | Hale | 354/300 X |
| 4,441,803 | 4/1984 | Pelis | 354/300 X |
| 4,449,815 | 5/1984 | Staffan | 355/106 |

*Primary Examiner*—Richard A. Wintercorn
*Attorney, Agent, or Firm*—William L. Botjer

[57] ABSTRACT

There is disclosed a diazotype copier for deodorizing developed diazocopy material. The copier includes a light source for exposing the diazotype copy material and a developing chamber for developing the exposed copy material. After exiting the developing chamber, the developed material passes under a heating chamber which includes a heating element and means for providing a flow of air into the chamber, around the heating element, and across the developed copy material. The heating air releases the entrapped ammonia vapors from the developed copy material. Thereafter, the air, including the released ammonia vapors, flows toward and into a scavenging device which neutralizes the ammonia vapors.

9 Claims, 4 Drawing Figures

DEVICE FOR DEGASSING DIAZOTYPE MATERIALS BY CONVECTION HEATING

BACKGROUND OF THE INVENTION

This invention relates to diazocopiers and, more particularly, to diazocopiers including apparatus for ensuring that the copies produced by the copier are as free from odors as possible.

In diazocopiers the developing medium is ammonia ($NH_3$) which, as is well-known, has an unpleasant odor. It is, accordingly, desirable that as much ammonia vapor as possible be eliminated from the copy material before it exits the copier. Certain diazotype machines such as those disclosed in U.S. Pat. No. 4,059,405 (Barto et al), assigned to the assignee herein, include scavenging and neutralizing devices for eliminating ammonia fumes released in the development process. The disclosure of U.S. Pat. No. 4,059,405 is incorporated herein by reference.

One aspect of the odor problem which is associated with diazotype copiers results from the fact that the print medium, which in most instances is a fibrous material such as paper, absorbs ammonia vapors which are released to the air after the paper exits the copier. It has been found that heating this diazotype copy material after it has been developed serves to release entrapped ammonia vapors where they may be collected before exiting the copier. A number of attempts have been proposed for solving the entrapped ammonia vapor problem by heating the developed diazotype copy material.

One arrangement for post-development heating of the copy material is found in U.S. Pat. No. 4,371,247 (Hewelt et al) in which the copy material is heated via intimate contact with a heated roller after exiting the developing chamber. This arrangement has been found less than completely satisfactory, however, because the copy material must intimately contact the heating element which requires complex control over the heating element in order to avoid degrading the paper or overheating. This arrangement also requires a "wind-up" roller for assuring that the paper stays in close proximity to the heating roller.

Other arrangements for the post-development heating of the copy material may be found in U.S. Pat. Nos. 4,092,655 (Schroter) and 4,109,268 (Schroter) which disclose the use of infrared tubes to provide the heating. However, these arrangements have also been less than completely satisfactory because they also require complex control over the temperature of the infrared tubes and over the speed at whch the copy material is fed through the copier.

OBJECTS AND SUMMARY OF THE INVENTION

Accordingly, it is a general object of this invention to avoid or substantially alleviate the above-discussed problems of the prior art.

A more specific object of this invention to provide a diazotype copier having means for releasing entrapped ammonia vapors in the developed copy material.

It is a further object of this invention to provide a diazotype copier utilizing means for post-development convection heating of the diazotype copy material in an efficient and economical manner.

It is another object of this invention to provide a diazotype copier with post-development heating of the copy material that does not require complex control of the heating element.

Still another object of this invention is to provide means for releasing entrapped ammonia vapors in diazotype copy material that is suitable for use with large volume copiers.

Other objects and advantages of this invention will become apparent from the following summary of the invention and description of its preferred embodiments.

The present invention provides an improved diazotype copier for deodorizing developed diazocopy material. The copier includes a light source for exposing the diazotype copy material and a developing chamber for developing the exposed copy material. After exiting the developing chamber, the developed material is transported to a heating chamber which includes a heating element and means for providing a flow of air into the chamber, around the heating element and across the developed copy material. The heated air releases the entrapped ammonia vapors from the developed copy material. Thereafter, the air containing the released ammonia vapors flows towards a scavenging device for neutralization.

An advantage of a copier constructed in accordance with the present invention is that effective degassing of the copy material can take place within a minimal distance of the developing chamber, i.e., smaller copies are allowed to exit the copier without becoming trapped within because of its compact size. Furthermore, the use of a heated air stream is more efficient than other types of heating, such as infrared heating or heating rollers and allows more thorough degassing at any given temperature. This permits lower temperatures per given degree of effectiveness without causing the copy material to become overheated to the point of degrading the base material.

To further advantage is the manner in which the temperature of hot air stream lowers quickly as it moves away from the exiting copy, making it unnecessary to utilize more complex control over the heating element, such as the timing devices used in the prior art to prevent overheating. Such cyclic control generally degrades the life of resistance type heaters.

BRIEF DESCRIPTION OF THE DRAWINGS

For a better understanding of the invention, reference is made to the following drawings to be taken in connection with the detailed description of the preferred embodiments.

DESCRIPTION OF THE PREFERRED EMBODIMENTS

Figures 1, 1A:
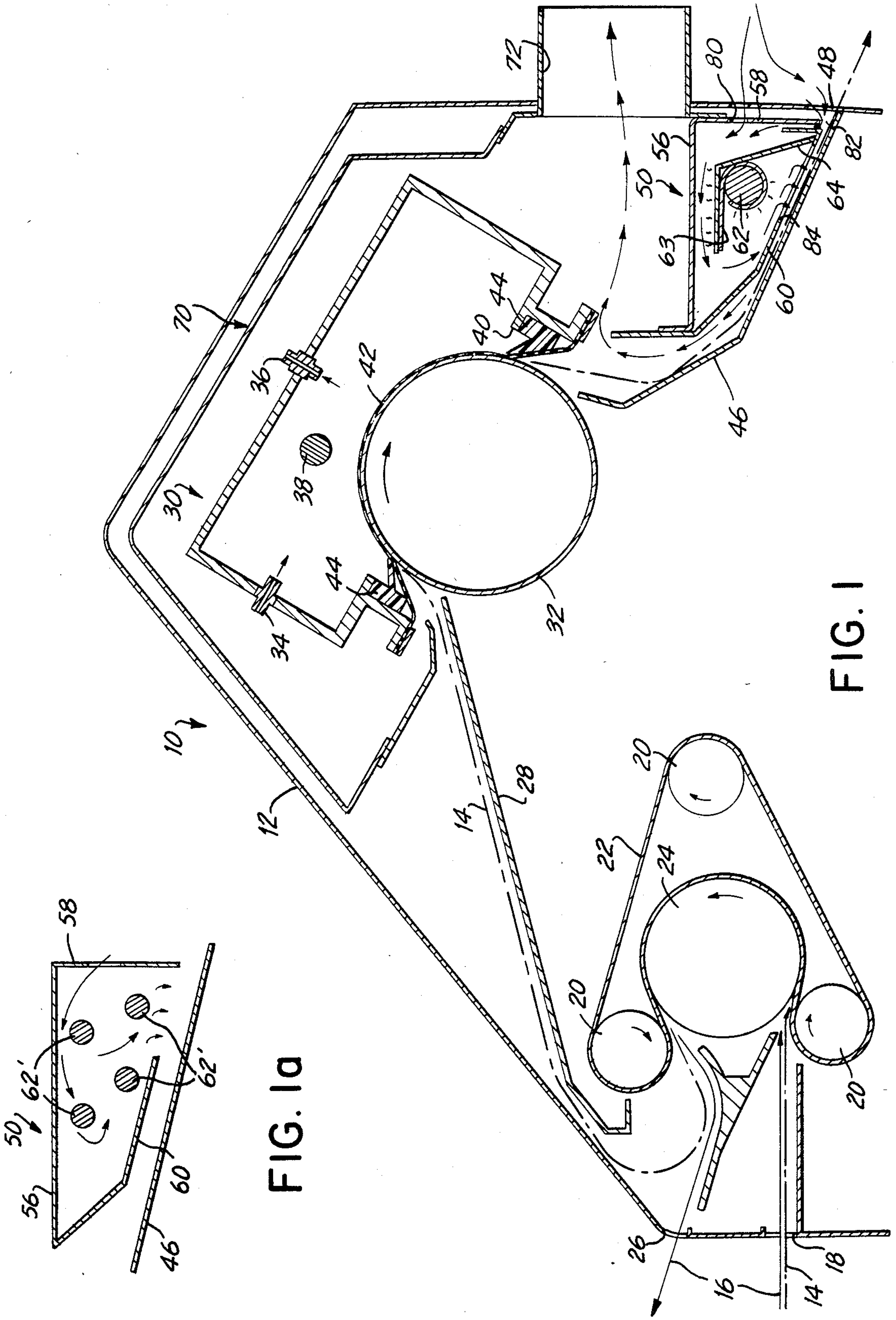
FIG. 1 is a sectional view of one embodiment of a diazotype copier constructed in accordance with the instant invention.
FIG. 1*a* is a sectional view of an alternative embodiment of the heating chamber with multiple heating elements.

The drawings illustrate an improved diazotype copier 10 which includes a light tight outer housing 12 for exposing and developing a sheet of diazotype copy material 14 which is placed in face to face contact with a transparent or translucent original 16. The sandwich of copy material 14 and original 16 enters copier 10 through a slot 18 in the front of housing 12 and is engaged by printer rollers 20 which are rotatably driven by a motor (not shown) via a drive belt 22. Original 16 and copy material 14 travel around a light source 24 which exposes copy material 14. After exposure, original 16 exits copier 10 through a slot 26 in the front of housing 12 and copy material 14 proceeds through copier 10 over a guide plate 28 to a developing chamber 30.

A rotating developer roller 32 draws copy material 14 through developer chamber 30. Developer chamber 30 includes an ammonia inlet 34, an ammonia outlet 36 and a heater 38. Ammonia inlet 34 and outlet 36 are connected to an ammonia vapor circulation system (not shown) the details of which are well known to those skilled in the art. The lower portion of chamber 30 has an opening 40 into which developer roller 32 extends. A perforated slip screen 42 extends across opening 40 and copy material 14 will be disposed between slip screen 42 and roller 32 as it passes through chamber 30 and is exposed to the ammonia vapor and developed. Opening 40 of chamber 30 is sealed by resilient elastomeric seals 44 which contact slip screen 42 and developer roller 32. The apparatus for exposure and development of copy material 14 is well known and any other suitable apparatus for exposure and development may also be used in conjunction with the present invention.

After exiting developer chamber 30, copy material 14 is transported along an angled exit guide plate 46 which directs copy material 14 towards an exit slot 48 in the rear of housing 12. Disposed above exit guide plate 46 is a heating chamber 50 which includes an upper wall 56, a rear wall 58 and a lower wall 60. Disposed within heating chamber 50 is a heating element 62 mounted by a bracket 63 under a generally L-shaped baffle plate 64. Heating element 62 is preferably a resistance type heating element which is operated so as to provide heated air temperatures from 180° to 250° F. Heating element 62 does not require complex thermostatic control since it does not contact copy material 14 and is subject to a flow of circulating air.

The single heating element 62 and baffle plate 64 can be replaced by multiple heating elements 62'. Multiple heating elements such as the four shown in FIG. 1*a* eliminate the need for baffle plates as the heating elements act as their own baffle plates. In this specification whenever the term heating element is used, multiple heating elements may be substituted therefore with the baffle plate eliminated.

Figure 2:
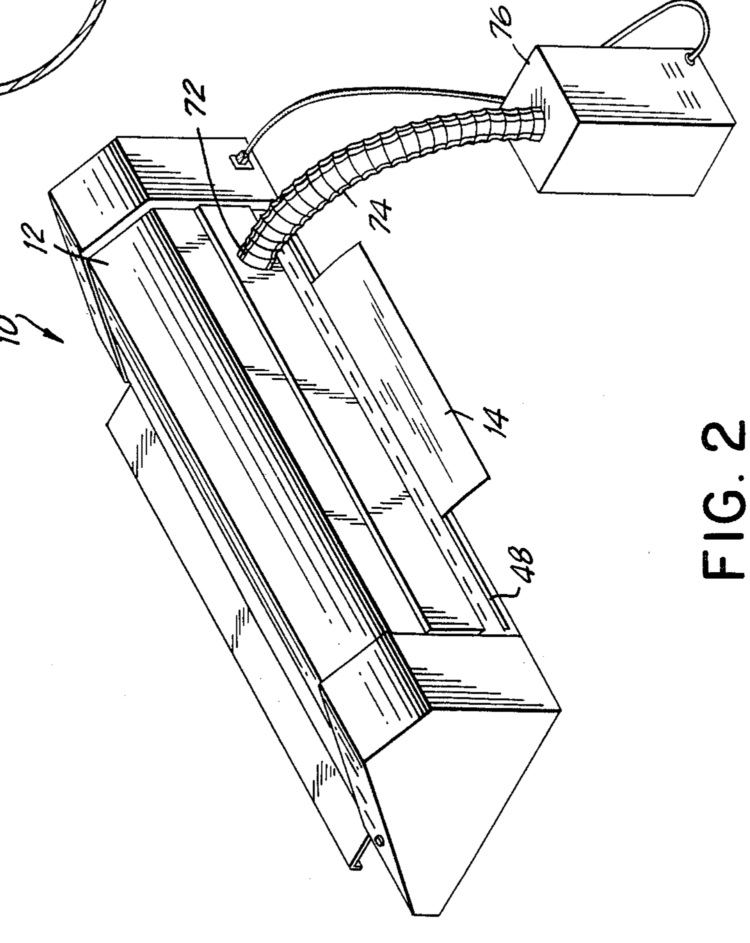
FIG. 2 is a rear perspective view of the diazotype copier and its associated scavenging and neutralizing device.

Disposed above heating chamber 50 is a scavenging chamber 70 which surrounds and encloses developer chamber 30. A hose fitting 72 extends from scavenging chamber 70. Connected to hose fitting 72 is the hose 74 of the scavenging and neutralizing device 76 shown in FIG. 2. Scavenging and neutralizing device 76 includes a vacuum pump to draw out the ammonia vapor released from copy material 14 and from developer chamber 30. The pump of scavenging and neutralizing device 76 also provides the impetus for the movement of air from the outside of copier 10 through heating chamber 50, over developed copy material 14 and thereafter into scavenging device 76. Scavenging device 76 neutralizes the ammonia vapor through chemical reaction. A variety of scavenging and neutralizing devices are suitable for use with the present invention. One particularly advantageous scavenging and neutralizing device is described in U.S. Pat. No. 4,059,409, the disclosure of which has been incorporated by reference herein.

Rear wall 58 of heating chamber 50 includes slots 80 and 82 to permit ambient air to enter. As the ambient air enters, it is directed around baffle plate 64 and towards heater element 62 where the temperature of the air is increased. The lower wall 60 of heating chamber 50 includes an opening 84 through which the air, which enters through slots 80 and 82 of wall 58 and is heated by heating element 62, impinges upon copy material 14. The heated air causes copy material 14 to release any entrapped ammonia vapor to the air stream. Thereafter, the action of the pump of scavenging and neutralizing device 76 causes the air and the released ammonia vapor to flow around the outside of wall 60 and be drawn upwardly and out of heating chamber 50 into scavenging chamber 70. The ammonia vapors released from copy material 14 are then exhausted and neutralized by scavenging device 76.

Figure 3:
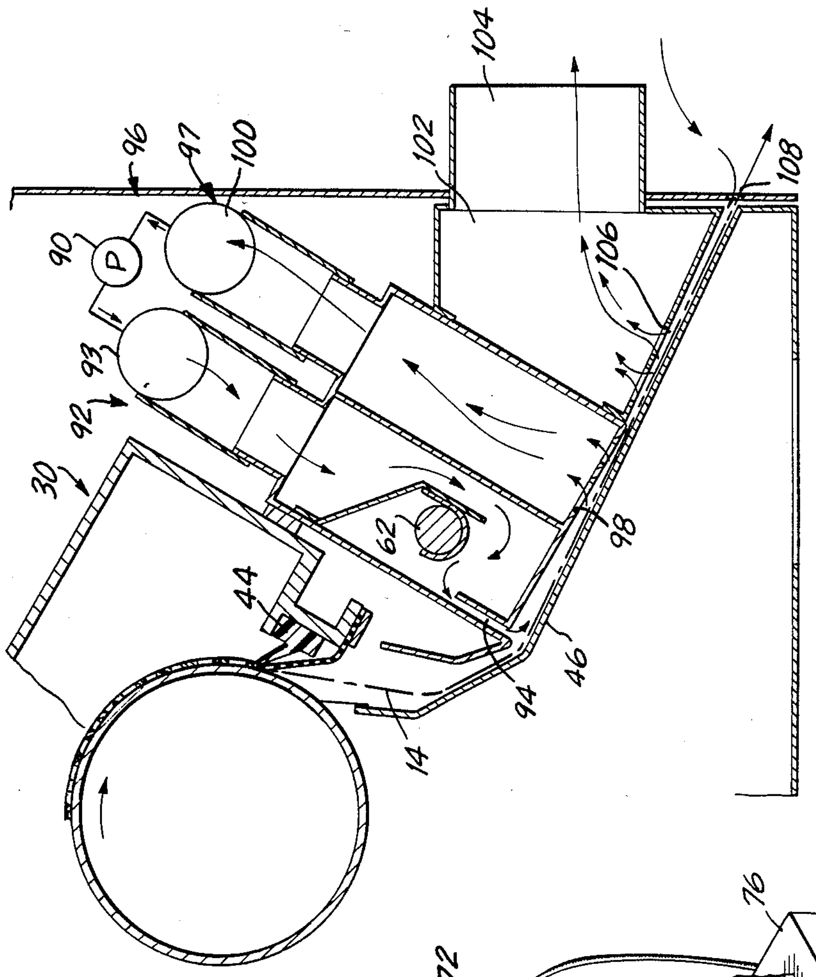
FIG. 3 is a partial sectional view of a diazotype copier constructed in accordance with another embodiment of the invention.

FIG. 3 illustrates another embodiment of a diazotype printer including a post-development heating arrangement which is particularly suitable for use with printers of larger capacity. In FIG. 3, the same reference numerals are used to illustrate the same structure as set forth in FIGS. 1 and 2. In the FIG. 3 embodiment, the heated air does not flow by means of scavenging device 76 alone; the heated air flow in the FIG. 3 embodiment is aided by means of a pump 90. In this same embodiment, copy material 14, after exiting developer chamber 30, passes under three separate chambers which act upon copy material 14 as it moves along exit guide plate 46. The first chamber is a heating chamber 92 which includes an inlet 93 which receives the air flow from pump 90 and includes a baffle plate 91 and a heating element 93 similar to that described with respect to FIG. 1. The air flow from pump 90 is heated in chamber 92, exits through a slot 94 in the lower end of chamber 92, and thus impinges upon copy material 14. The heated air then releases the ammonia vapors entrapped in copy material 14. Copy material 14 then moves towards a recirculating chamber 96 which includes slots 98 at its lower end for the intake of the heated air after it passes over copy material 14. The upper portion of recirculating chamber 96 includes an exhaust outlet 97 connected to pump 92. Thus, the air exhausted from recirculation chamber 96 is recirculated via pump 90 to heating chamber 92. The heating efficiency of heater element 93 is thus improved due to the fact that its heat is not lost to the atmosphere. Pump 90 may be selected from any number of electrically operated pumps or blowers in order to provide a sufficient flow of air between recirculation chamber 96 and heating chamber 92.

After passing under recirculation chamber 96, copy material 14 moves towards a scavenging chamber 102 having a hose fitting 104 for connection to scavenging and neutralizing device 76. Air enters through an exit slot 108 and moves rapidly along the surface of exiting copy material 14 picking up the liberated ammonia vapor which will enter scavenging chamber 102 through slots 106 and thereafter flow into scavenging and neutralizing device 76.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

We claim:

1. A diazotype copier for exposing and developing diazotype copy material comprising:

a housing, which includes an exit slot through which said copy material may exit said copier;

an exit guide plate disposed proximate said exit slot over which said copy material passes;

means for transporting said copy material through said copier;

means for exposing said copy material to light;

means for developing said copy material by treatment with ammonia vapor; and a heating chamber disposed above said exit guide plate for acting upon said copy material after said copy material has been developed, said heating chamber including a heat source disposed therein, means for providing a flow of air into said heating chamber and towards said heat source to thereby provide a flow of heated air, and means for directing said heated air across said developed copy material as it passes over said exit guide plate to thereby release ammonia vapors entrapped therein.

2. The diazotype copier of claim 1 wherein said copier includes means for scavenging and neutralizing said released ammonia vapors, said scavenging and neutralizing means also comprising said means for providing a flow of air into said heating chamber.

3. The diazotype copier of claim 1 wherein said copier further includes baffle means disposed in said chamber proximate said heat source to direct said air flow around said heating means.

4. The diazotype copier of claim 1 wherein said developing means comprises a developing chamber through which said copy material passes, and wherein a scavenging chamber encloses said developing chamber which is disposed proximate said heating chamber, and a scavenging and ammonia neutralizing device is connected to said scavenging chamber, said scavenging device causing said flow of air into said heating chamber, said air flowing over said copy material, then into said scavenging chamber and thereafter into said scavenging device.

5. The diazotype copier of claim 1 wherein said copier further includes a recirculation chamber disposed proximate to said heating chamber, air pump means connected between said heating chamber and said recirculation chamber, said air pump means exhausting air from said recirculation chamber and providing said flow of air into said heating chamber, said recirculation chamber including means for the intake of said heated air flow from said heating chamber after said heated air flow passes over said copy material.

6. The diazotype copier of claim 5 wherein said copier further includes a scavenging chamber constructed and arranged to act upon said copy material after said copy material exits said recirculation chamber, said scavenging chamber including openings through which ambient air may enter and a scavenging device coupled to said scavenging chamber, said scavenging device causing said ambient air to enter said scavenging chamber, flow over said copy material and thereafter flow into said scavenging chamber.

7. The diazotype copier of claim 1 wherein said housing further includes air intake slots disposed proximate said exit slot, the flow of air into said heating chamber taking place through said air intake slots.

8. The diazotype copier of claim 1 wherein said heat source comprises at least two electrical heating elements.

9. A diazotype copier for exposing and developing diazotype copy material comprising:

means for transporting said copy material through said copier;

means for exposing said copy material to light;

means for developing said copy material by treatment with ammonia vapor; and a heating chamber constructed and arranged to act upon said copy material after said copy material has been developed, said heating chamber including a heat source disposed therein, means for providing a flow of air into said heating chamber and towards said heat source to thereby provide a flow of heated air, and means for directing said heated air across said developed copy material to thereby release ammonia vapors entrapped therein;

a recirculation chamber disposed proximate to said heating chamber, air pump means connected between said heating chamber and said recirculation chamber, said air pump means exhausting air from said recirculation chamber and providing said flow of air into said heating chamber, said recirculation chamber including means for the intake of said heated air flow from said heating chamber after said heated air flow passes over said copy material; and a scavenging chamber constructed and arranged to act upon said copy material after said copy material exits said recirculation chamber, said scavenging chamber including openings through which ambient air may enter and a scavenging device coupled to said scavenging chamber, said scavenging device causing said ambient air to enter said scavenging chamber, flow over said copy material and thereafter flow into said savenging chamber.

* * * * *